Patented July 10, 1951

2,559,625

UNITED STATES PATENT OFFICE 2,559,625

ISOLATION OF AN ORGANIC SULFUR COMPOUND FROM ASPARAGUS

Eugene F. Jansen, Berkeley, Calif., assignor to the United States of America as represented by the Secretary of Agriculture No Drawing. Original application April 15, 1949, Serial No. 87,823. Divided and this application April 14, 1950, Serial No. 156,034

6 Claims. (Cl. 260—1)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to me of any royalty thereon.

This application is a division of my co-pending patent application Serial No. 87,823, filed April 15, 1949, issued January 30, 1951, as Patent No. 2,539,428.

This invention relates to organic sulphur compounds and has among its objects the provision of processes for isolating an organic disulphide compound contained in asparagus. Other objects will be apparent from the description of the invention.

One phase of this invention involves the provision of a process for isolating an organic disulphide compound from asparagus. This compound, the existence of which has not been heretofore known, is useful as an intermediate for chemical sytheses and for other purposes as will appear hereinafter. The process by which this disulphide compound is isolated involves extracting asparagus juice with an organic polar solvent whereby a polar solvent extract is obtained which contains the disulphide compound together with some impurities. This extract is then further treated to separate the desired compound from the impurities. It has been found that the disulphide compound has a carboxylic group and in its acid form is preferentially soluble in organic solvents, whereas in its salified (neutralized) form it is preferentially soluble in water. Therefore, further purification is effected by carrying out one or more transfers from solution in organic solvent to solution in water and vice versa. In transferring from organic solvent to water, basic conditions are employed, whereas for the reverse transfer, acidic conditions are employed. The number of transfers to be carried out depends, of course, on the degree of purity desired. For some purposes, it is sufficient to transfer the compound from organic solvent to water and then back to organic solvent, and then evaporate the solvent to obtain the product. In other cases where highly purified product is desired, the transfers can be repeated to eliminate all impurities. For complete and exhaustive purification, the following procedure is used: Asparagus juice is extracted with a polar organic solvent whereby a polar solvent extract is obtained which contains the desired organic disulphide compound plus impurities such as phenolic compounds, non-acidic compounds, and so forth. This extract is then extracted with an aqueous alkaline solution. By this treatment the disulphide compound is transferred to the aqueous phase, but various impurities, particularly phenolic compounds, remain in the solvent phase. The aqueous extract is then acidified and extracted with a polar organic solvent whereby the disulphide compound is transferred to the solvent phase and a further elimination of impurities is effected. The solvent phase is then concentrated, preferably under vacuum, to remove all the water therefrom. The concentrated solution is then mixed with an excess of an organic fat solvent whereby impurities low in sulphur content are precipitated. The disulphide compound is again transferred to aqueous solution by extraction with aqueous alkaline solution and this aqueous phase, after acidification, is extracted with an organic fat solvent. The resulting extract contains the disulphide compound in substantially pure form and it can be recovered in solid form by evaporation of the solvent.

In the foregoing isolation technique many alternative materials may be used. For example, butanol (i. e., normal butyl alcohol) is the preferred polar solvent; however, other polar solvents can be employed which are miscible with water to the extent of about 5 percent to about 20 percent, as for example, isobutyl alcohol, secondary butyl alcohol, n-amyl alcohol, isoamyl alcohol, and so forth.

In the transfers to aqueous solution the alkaline material is preferably sodium bicarbonate, but other similar moderate alkaline materials are suitable, such as potassium bicarbonate, potassium carbonate, sodium carbonate, borax, potassium tetraborate, ammonium hydroxide, ammonium carbonates, and so forth.

In the acidification steps, any water-soluble acid may be used, as for example, hydrochloric, sulphuric, phosphoric, acetic, and so forth.

As the organic fat solvent, benzene is preferred, but toluene, xylenes, carbon tetrachloride, chloroform, ethylene dichloride, ether, hexane, octane, and mixtures of hydrocarbons such as gasoline, petroleum ether, Stoddard solvent, benzine, naphtha, and other organic fat solvents may be used.

The disulphide compound isolated from asparagus juice is a yellow amorphous material which contains the radical

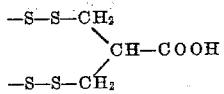

Since it contains a carboxylic radical, it forms salts just as do other carboxylic acids. It is insoluble in water but soluble in aqueous alkaline solutions. It is also soluble in many organic solvents such as alcohol, benzene, ether, and so forth. It contains approximately 43 percent carbon, 6 percent hydrogen, and 30 percent sulphur and its neutral equivalent is 360—this figure signifying that each 360 grams thereof contains one carboxylic radical. The material tends to polymerize on standing either as such or in solution, becoming insoluble in organic solvents.

The organic disulphide compound isolated in accordance with this invention is useful as an intermediate for the preparation of diverse types of derivatives. Thus, for example, it may be used to prepare 3,3'-dithiolisobutyric acid, a compound useful as an anti-Lewisite agent and as a regulator for enzymic reactions. In preparing 3,3'-dithiolisobutyric acid, the organic disulphide compound is subjected to a reduction process. The preferred technique involves dissolving the asparagus disulphide compound in a suitable inert solvent, as for example, anhydrous liquid ammonia, and then reducing it with an alkali metal such as sodium or potassium. The alkali metal derivative of the 3,3'-dithiolisobutyric acid so formed is then converted into the acid itself by addition of a mineral acid such as hydrochloric, sulphuric, and so forth. If it is desired to obtain a purified product, the acidified reaction mass is extracted with an inert organic solvent such as benzene, toluene, xylenes, petroleum naphtha, hexane, and so forth, and the dithiol acid recovered therefrom by concentrating and cooling. This procedure is shown in Example II herein, and the reactions involved in this synthesis are illustrated by the following equation

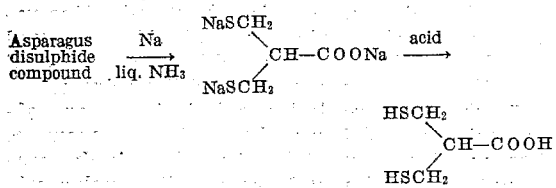

3,3'-dithiolisobutyric acid can be converted into its salts by reaction with suitable hydroxides, carbonates, or other inorganic compounds. For example, the sodium salt of the dithiol acid can be prepared by reacting it with sodium hydroxide or sodium carbonate. In the same manner any desired salt can be prepared by the usual neutralization or metathetic techniques. Salt formation is not limited to inorganic salts as salts may also be made with organic bases such as amines, quaternary ammonium compounds, ternary sulphonium compounds, for example, methyl amine, triethanol amine, glyceryl amine, aniline, morpholine, brucine, strychnine, pyridine, piperidine, tetraethyl ammonium hydroxide, dodecyl trimethyl ammonium hydroxide, triethyl sulphonium hydroxide, and so forth.

The synthesis of many other types of organic compounds from the asparagus disulphide compound is disclosed in my prior application Serial No. 87,823, filed April 15, 1949, issued as Patent No. 2,539,428.

EXAMPLE I

*Isolation of the asparagus disulphide compound*

A supply of asparagus concentrate was procured. This concentrate was prepared by evaporating the juice pressed from asparagus butts until the solids content was 62.5 percent. A 9 gallon sample of the concentrate (40 kilos) was diluted with an equal weight of water. This solution, which had a pH of 4.5, was extracted with 7 gallons of butanol by agitation for 20 minutes. After standing for 2 hours the liquid was centrifuged, the butanol phase thus being separated from the aqueous phase. The butanol phase was then extracted with 3 gallons of dilute aqueous sodium bicarbonate solution (4 lbs. NaHCO₃ per gallon). The bicarbonate extract was separated and acidified to pH 3 with phosphoric acid, and extracted with 4 gallons of butanol. The butanol extract was evaporated at 35° C. and under vacuum to a volume of 270 ml. This concentrate was filtered and to it was added 1300 ml. of benzene, and the precipitated material removed by filtration. The butanol-benzene solution was then extracted with 550 ml. of 5 percent sodium bicarbonate solution; the bicarbonate solution was washed with benzene, and then acidified to pH 2 with sulphuric acid. Some sticky black insoluble material was removed by filtration and centrifugation. The bicarbonate solution was then extracted with 3 liters of ether and the ether extract dried over anhydrous sodium sulphate and then evaporated to a volume of 100 ml. This ether solution contained 31.7 grams of the disulphide compound.

EXAMPLE II

*Reduction of the asparagus disulphide compound to 3,3'-dithiolisobutyric acid*

To 175 ml. of liquid ammonia was added 13 ml. of the ethereal solution prepared in accordance with Example I above, this ether solution containing 4.1 grams of the disulphide compound.

Metallic sodium was added in small pieces until a relatively permanent blue color was obtained. As the reduction proceeded the material went into solution. The ammonia was allowed to evaporate spontaneously. The residue was taken up in 40 ml. of water and quickly acidified with concentrated hydrochloric acid to pH 2. This aqueous material was frozen, then dried under vacuum. The residue was allowed to stand overnight with 600 ml. of petroleum ether (B. P. 92–100°) and then re-extracted with 200 ml. of petroleum ether. The combined petroleum ether extract was cooled to —18° for several days. Colorless crystals of 3,3'-dithiolisobutyric acid separated. Upon recrystallization from 800 ml. of petroleum ether, 1.97 grams of 3,3'-dithiolisobutyric acid was obtained corresponding to a 48 percent yield on a solid basis. The product melted at 61–62°.

Analysis: $C_4H_8O_2S_2$

Calculated: C, 31.56; H, 5.30; S, 42.12; mol. wt., 152

Found: C, 32.3; H, 5.30; S, 41.6; neutral equivalent, 152; mol. wt., 155; equivalent weight by —SH titration, 77.

Having thus described the invention, what is claimed is:

1. A process of isolating a disulphide compound contained in asparagus juice comprising extracting asparagus juice with an alcohol which is miscible with water to the extent of about 5 percent to about 20 percent, extracting the alcohol extract with aqueous alkaline solution, acidifying the resulting aqueous extract and extracting it with an organic solvent.

2. A process in accordance with claim 1 wherein the alcohol is butanol.

3. A process for isolating an organic disulphide compound contained in asparagus juice which comprises extracting asparagus juice with an alcohol which is miscible with water to the extent of about 5 percent to about 20 percent, extracting the alcohol extract with an aqueous alkaline solution, acidifying the aqueous alkaline extract and extracting it with an alcohol of the aforesaid type, adding an organic fat solvent to the alcohol extract to precipitate impurities, removing said impurities, subjecting the fat solvent-alcohol solution to extract with aqueous alkaline solution, then acidifying the aqueous alkaline extract and extracting it with an organic fat solvent.

4. A process in accordance with claim 3 wherein the alcohol is butanol.

5. A process of isolating a disulphide compound contained in asparagus juice comprising extracting the asparagus juice with an alcohol which is miscible with water to the extent of about from 5 percent to 20 percent, thereby obtaining an alcohol extract containing the desired disulphide compound plus various impurities extracting this alcohol extract with an aqueous alkaline solution thereby transferring the disulphide compound to the aqueous phase while some of the impurities remain in the alcohol phase, acidifying the aqueous phase and extracting it with an alcohol which is miscible with water to the extent of about from 5 percent to 20 percent whereby the disulphide compound is transferred to the alcohol phase while other impurities remain in the aqueous phase, concentrating the alcohol phase, mixing the resulting concentrate with an organic fat solvent whereby impurities are precipitated, extracting the resulting fat solvent solution with aqueous alkaline solution thereby transferring the disulphide compound to an aqueous solution, acidifying this aqueous solution and extracting it with an organic fat solvent thereby transferring the disulphide compound to the solvent phase, and removing the solvent to recover the disulphide compound in solid, substantially pure form.

6. A process of isolating a disulphide compound contained in asparagus juice comprising extracting the asparagus juice with butanol thereby obtaining a butanol extract containing the desired disulphide compound plus various impurities, extracting this butanol extract with an aqueous sodium bicarbonate solution thereby transferring the disulphide compound to the aqueous phase while some of the impurities remain in the butanol phase, acidifying the aqueous phase and extracting it with butanol whereby the disulphide compound is transferred to the butanol phase while other impurities remain in the aqueous phase, concentrating the butanol phase to remove all water therefrom and filtering it, mixing the resulting concentrated filtrate with benzene whereby impurities low in sulphur content are precipitated and removed by filtration, extracting the resulting benzene-butanol filtrate with an aqueous sodium bicarbonate solution thereby transferring the disulphide compound to aqueous solution, acidifying this aqueous solution and extracting it with ether thereby transferring the disulphide compound to the ether phase, and removing the ether to recover the disulphide compound in solid, substantially pure form.

EUGENE F. JANSEN.

REFERENCES CITED

The following references are of record in the file of this patent:

UNITED STATES PATENTS

| Number | Name | Date |
|---|---|---|
| 2,052,219 | Dickens | Aug. 25, 1936 |
| 2,459,139 | Dimick | Jan. 18, 1949 |
| 2,476,085 | Dimick | July 12, 1949 |
| 2,481,763 | Lineweaver | Sept. 13, 1949 |

OTHER REFERENCES

Schertz: Plant Physiology, 3, 211–216 (1928).
Methods of Analysis A. O. A. C., page 794, A. O. A. C., Washington, D. C., Ed. 6, 1945.